(12) United States Patent
Fenyvesi et al.

(10) Patent No.: US 8,058,326 B2
(45) Date of Patent: Nov. 15, 2011

(54) FLUORESCENT POLY(ALKYLENE TEREPHTHALATE) COMPOSITIONS

(75) Inventors: Gyorgyi Fenyvesi, Wilmington, DE (US); Joseph V. Kurian, Hockessin (DE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 12/369,851

(22) Filed: Feb. 12, 2009

(65) Prior Publication Data

US 2009/0146106 A1  Jun. 11, 2009

(51) Int. Cl.
| | |
|---|---|
| F21V 7/22 | (2006.01) |
| C08K 7/02 | (2006.01) |
| C08K 5/00 | (2006.01) |
| C08K 5/15 | (2006.01) |
| C08G 73/06 | (2006.01) |
| C09K 11/02 | (2006.01) |
| C09K 11/06 | (2006.01) |

(52) U.S. Cl. ......... 523/172; 523/222; 528/423; 524/87; 524/107; 252/301.35

(58) Field of Classification Search ............ 524/87, 524/107; 523/172, 222; 528/423; 252/301.35
See application file for complete search history.

(56) References Cited

U.S. PATENT DOCUMENTS

| | | | |
|---|---|---|---|
| 3,671,379 A * | 6/1972 | Evans et al. ............... 428/362 |
| 3,869,469 A | 3/1975 | Neuner et al. |
| 4,048,185 A | 9/1977 | Pintschovius et al. |
| 4,049,376 A | 9/1977 | Le Pape |
| 4,347,350 A | 8/1982 | Horner et al. |
| 4,452,720 A | 6/1984 | Harada et al. |
| 4,892,922 A | 1/1990 | Weaver et al. |
| 5,015,789 A | 5/1991 | Arntz et al. |
| 5,091,501 A | 2/1992 | Weaver et al. |
| 5,239,045 A * | 8/1993 | Hirahara et al. ........... 528/272 |
| 5,276,201 A | 1/1994 | Haas et al. |
| 5,284,979 A | 2/1994 | Haas et al. |
| 5,334,778 A | 8/1994 | Haas et al. |
| 5,340,909 A | 8/1994 | Doerr et al. |
| 5,364,984 A | 11/1994 | Arntz et al. |
| 5,364,987 A | 11/1994 | Haas et al. |
| 5,391,263 A | 2/1995 | Hepner et al. |
| 5,434,239 A | 7/1995 | Bhatia |
| 5,504,122 A | 4/1996 | Michel et al. |
| 5,510,454 A | 4/1996 | Stouffer et al. |
| 5,532,333 A | 7/1996 | Stouffer et al. |
| 5,532,404 A | 7/1996 | Gallagher |
| 5,540,868 A | 7/1996 | Stouffer et al. |
| 5,633,018 A | 5/1997 | Stouffer et al. |
| 5,633,362 A | 5/1997 | Nagarajan et al. |
| 5,677,415 A | 10/1997 | Bhatia |
| 5,686,276 A | 11/1997 | Laffend et al. |
| 5,710,315 A | 1/1998 | Gallagher |
| 5,714,262 A | 2/1998 | Stouffer et al. |
| 5,730,913 A | 3/1998 | Stouffer et al. |
| 5,763,104 A | 6/1998 | Stouffer et al. |
| 5,774,074 A | 6/1998 | Cooper et al. |
| 5,786,443 A | 7/1998 | Lowe |
| 5,798,433 A | 8/1998 | Schmidt et al. |
| 5,811,496 A | 9/1998 | Iwasyk et al. |
| 5,821,092 A | 10/1998 | Nagarajan et al. |
| 5,830,982 A | 11/1998 | Stouffer et al. |
| 5,840,957 A | 11/1998 | Kurian et al. |
| 5,856,423 A | 1/1999 | Bhatia |
| 5,962,745 A | 10/1999 | Brossmer et al. |
| 5,985,389 A | 11/1999 | Dalton et al. |
| 5,990,265 A | 11/1999 | Blanchard et al. |
| 6,103,006 A | 8/2000 | DiPietro |
| 6,153,679 A | 11/2000 | Kawaji et al. |
| 6,221,279 B1 | 4/2001 | Strand et al. |
| 6,235,948 B1 | 5/2001 | Sunkara et al. |
| 6,245,844 B1 | 6/2001 | Kurian et al. |
| 6,255,442 B1 | 7/2001 | Kurian et al. |
| 6,277,289 B1 | 8/2001 | Kurian et al. |
| 6,281,325 B1 | 8/2001 | Kurian et al. |
| 6,287,688 B1 | 9/2001 | Howell et al. |
| 6,312,805 B1 | 11/2001 | Sun |
| 6,325,945 B2 | 12/2001 | Kurian et al. |
| 6,331,264 B1 | 12/2001 | Kurian et al. |
| 6,333,106 B2 | 12/2001 | Howell et al. |
| 6,335,421 B1 | 1/2002 | Kurian et al. |
| 6,350,895 B1 | 2/2002 | Kurian |
| 6,353,062 B1 | 3/2002 | Giardino et al. |
| 6,538,076 B2 | 3/2003 | Giardino et al. |
| 6,635,347 B1 * | 10/2003 | Yoshida .................. 428/395 |
| 6,680,353 B1 | 1/2004 | Kato et al. |
| 6,692,687 B2 | 2/2004 | Chang et al. |
| 6,723,799 B2 | 4/2004 | Sun et al. |
| 6,787,630 B1 | 9/2004 | Cominguez De Walter et al. |

(Continued)

FOREIGN PATENT DOCUMENTS

EP          0699700          3/1996

(Continued)

OTHER PUBLICATIONS

H. L. Traub, "Synthesis and Textile Chemical Properties of Poly-Trimethyleneterephthalate", Dissertation Universitat Stuttgart (1994).

(Continued)

*Primary Examiner* — Kriellion Sanders

(57) ABSTRACT

Fluorescent poly(alkylene terephthalate) compositions are provided. The fluorescent poly(alkylene terephthalate) compositions contain fluorescent poly(alkylene terephthalate)s and are made from fluorescent compounds and poly(alkylene terephthalate) oligomers, or by polymerizing amine and acid monomers in the presence of fluorescent compounds.

15 Claims, 3 Drawing Sheets

U.S. PATENT DOCUMENTS

| | | | |
|---|---|---|---|
| 6,808,804 B2 * | 10/2004 | Hotaka et al. | 428/357 |
| 2001/0030378 A1 | 10/2001 | Howell et al. | |
| 2003/0065105 A1 * | 4/2003 | Kato et al. | 525/418 |
| 2004/0001950 A1 | 1/2004 | Chang et al. | |
| 2004/0059044 A1 * | 3/2004 | Olson et al. | 524/503 |
| 2004/0195552 A1 | 10/2004 | Weaver et al. | |
| 2005/0101703 A1 | 5/2005 | Martini et al. | |

FOREIGN PATENT DOCUMENTS

| | | |
|---|---|---|
| EP | 0 759 451 | 2/1997 |
| EP | 0847960 A1 | 6/1998 |
| EP | 0998440 | 5/2000 |
| EP | 1 275 758 | 1/2003 |
| EP | 1 298 236 | 4/2003 |
| GB | 851 792 | 10/1960 |
| GB | 1 242 700 | 8/1971 |
| JP | 56 034727 | 4/1981 |
| JP | 02 200811 | 8/1990 |
| JP | 04 082914 | 3/1992 |
| JP | 08 144151 | 6/1996 |
| JP | 09 59337 | 3/1997 |
| JP | 2000 282326 | 10/2000 |
| WO | WO92/07913 | 5/1992 |
| WO | WO 92/14770 | 9/1992 |
| WO | WO98/57913 | 12/1998 |
| WO | WO9903809 | 1/1999 |
| WO | WO00/14041 | 3/2000 |
| WO | WO/0026301 | 5/2000 |
| WO | WO 02/077088 | 10/2002 |

OTHER PUBLICATIONS

S. Schauhoff, "New Developments in the Production of Poly-Trimethylene Terephthalate (PTT)", Man-Made Fiber Year Book (Sep. 1996).

Copending U.S. Appl. No. 09/708,314, filed Nov. 8, 2000.

International Search Report; Date of Mailing: Jul. 5, 2005.

Written Opinion of the International Searching Authority; Date of Mailing: Jul. 5, 2005.

Derwent Abstract XP 002333630 of JP 2000 282326 published Oct. 10, 2000.

Derwent Abstract XP 002333631 of JP 04 082914 published Mar. 16, 1992.

Derwent Abstract XP 002333632 of JP 02 200811 published Aug. 9, 1990.

Derwent Abstract XP 002333633 of JP 56 034727 published Apr. 7, 1981.

Derwent Abstract XP 002333634 of JP 08 144151 published Jun. 4, 1996.

* cited by examiner

FLUORESCENT POLY(ALKYLENE TEREPHTHALATE) COMPOSITIONS

CROSS-REFERENCE TO RELATED APPLICATIONS

This application claims priority under 35 U.S.C. §119 from U.S. Provisional Application Ser. No. 60/603,064 (filed Aug. 10, 2004), and U.S. application Ser. No. 10/961,724, filed Oct. 8, 2004, now abandoned, which is incorporated by reference herein for all purposes as if fully set forth.

FIELD OF THE INVENTION

This invention relates to fluorescent compositions comprising a poly(alkylene terephthalate), such as a poly(trimethylene terephthalate), poly(ethylene terephthalate) and/or poly(tetramethylene terephthalate), and one or more fluorescent poly(alkylene terephthalate) or polyamide oligomers. The fluorescent poly(alkylene terephthalate) or polyamide oligomers can be prepared from one or more amines, diols, acids and fluorescent compounds, or from one or more polyester oligomers and one or more fluorescent compounds. The compositions are suitable for use in manufacturing polyester fibers, fabrics, films and other shaped articles and as markers for such fibers, fabrics, films and other shaped articles.

BACKGROUND

Polyesters, especially poly(alkylene terephthalate)s, have excellent physical and chemical properties and have been widely used for resins, films and fibers. In particular, polyester fibers have a high melting point, and can attain high orientation and crystallinity. Accordingly, polyesters have properties that are highly desirable in fibers, such as chemical, heat and light stability, and high strength.

The term poly(alkylene terephthalate) is well known to those skilled in the art, and encompasses, for example, poly(trimethylene terephthalate), poly(tetramethylene terephthalate), and poly(ethylene terephthalate). Poly(trimethylene terephthalate), also called poly(1,3-propyleneterephthalate) is prepared from terephthalic acid, or an ester thereof, and 1,3-propylene glycol (1,3-propanediol). The abbreviation "3GT" is also used to refer to poly(trimethylene terephthalate). Poly(tetramethylene terephthalate), also called poly(butylene terephthalate) or 4GT, is prepared from terephthalic acid or an ester thereof and 1,4-butanediol.

Some fluorescent polymers and oligomers are known. For Example, Weaver et al., in U.S. Pat. No. 5,091,501 discloses the conversion of certain cinnamic acid derivatives, under polyester-forming conditions and in the presence of suitable diol and acidic monomers, to form coumarin-containing polyesters. The diol and acidic monomers included 1,3-propanediol and terephthalic acid.

Krutak et al., in WO92/07913, describe polyester powders containing copolymerized therein at least 1% of a visible colorant. The colorant is introduced in solution in an organic solvent.

DiPietro in U.S. Pat. No. 6,103,006 discloses a fluorescent dye comprising: 3,4-benzoxanthrene dicarboxylic anhydride or the diacid (BXDA), a monomer having at least one carboxyl group, and a second monomer having at least one amine group or at least one alcohol group.

New and/or improved fluorescent polyesters are desirable. Fluorescent polyesters suitable for use in making fibers are also desirable. The present invention is directed to these and other important ends.

SUMMARY OF THE INVENTION

One aspect of the present invention is a fluorescent poly (alkylene terephthalate) composition comprising a fluorescent compound and a poly(alkylene terephthalate). In some embodiments, the fluorescent compound can be in the form of a preformed polyamide or a preformed polyester oligomer, which can be made by blending or coextruding the fluorescent compound with a poly(alkylene terephthalate). In some embodiments, the fluorescent poly(alkylene terephthalate) composition can be made by preblending a fluorescent compound with a carrier polymer that is subsequently blended with a poly(alkylene terephthalate). The fluorescent poly (alkylene terephthalate) composition can be prepared by batch or continuous processes.

In some embodiments, the intrinsic viscosity (IV) of the fluorescent polymeric composition can be increased by solid phase polymerization, a process comprising heating the polymer to an elevated temperature that is below the melting point of the polymeric composition, optionally in a vacuum.

In some embodiments, the fluorescent poly(alkylene terephthalate) composition is prepared by melt blending the fluorescent poly(alkylene terephthalate) with one or more polymers at a temperature within the range of 230-290° C. In some embodiments in which the poly(alkylene terephthalate) is poly(ethylene terephthalate), the temperature is preferably within the range of 255-290° C. In some embodiments in which the poly(alkylene terephthalate) is poly(trimethylene terephthalate), the temperature is preferably within the range of 240-255° C. In some embodiments in which the poly (alkylene terephthalate) is poly(tetramethylene terephthalate), the temperature is preferably within the range of 230-250° C.

Another aspect of the invention is a process for making a fluorescent poly(alkylene terephthalate) composition, which includes contacting one or more amine monomers, acids, diols, diacids, esters or diesters and one or more fluorescent compounds, optionally in the presence of an inorganic acid, optionally in the presence of water, and preferably at a temperature of about 200° C. or less, to form a fluorescent oligomer. For example, about 3 to 15 parts by weight of water is preferred, when an inorganic acid is present, based on the weight of the solid inorganic acid. The oligomer can be blended with a poly(alkylene terephthalate). In some embodiments, the fluorescent compound is copolymerized in the process as a monomer unit within the fluorescent oligomer.

In some embodiments, the oligomer can be blended with one or more polymers to form a fluorescent poly(alkylene terephthalate) composition. In some embodiments, the oligomer can be further polymerized to form the fluorescent poly (alkylene terephthalate) composition.

A further aspect of the invention is a process for making a fluorescent poly(alkylene terephthalate) composition, which includes: providing one or more fluorescent compounds and at least one poly(alkylene terephthalate) oligomer; contacting the fluorescent compound with the poly(alkylene terephthalate) oligomer in an inert environment at a temperature of about 240° C. to about 255° C. to form a mixture; and allowing the mixture to polymerize, to form a polymeric fluorescent poly(alkylene terephthalate) composition. In preferred embodiments, the poly(alkylene terephthalate) oligomer is selected from: poly(trimethylene terephthalate) oligomer, poly(ethylene terephthalate) oligomer and poly(tetramethylene terephthalate) oligomer. In some embodiments the process further includes applying vacuum to the mixture.

A further aspect of the invention is a process for making a fluorescent poly(alkylene terephthalate) composition, which includes blending at least one oligomer selected from poly (trimethylene terephthalate), poly(ethylene terephthalate) and poly(tetramethylene terephthalate) oligomers, with one or more fluorescent compounds in an inert environment at a temperature of about 240° C. to about 255° C., to form a fluorescent poly(alkylene terephthalate) oligomer. In some embodiments the fluorescent poly(alkylene terephthalate) oligomer can be further polymerized to form a fluorescent poly(alkylene terephthalate) composition. In some embodiments, the fluorescent poly(alkylene terephthalate) oligomer can be blended with a polymer to form a fluorescent poly (alkylene terephthalate) composition.

The compositions can be made in batch or continuous processes.

These and other aspects will be apparent to persons skilled in the art in view of the present disclosure and the appended claims.

BRIEF DESCRIPTION OF THE DRAWINGS

FIG. 1 shows the excitation profile and emission spectra of a fluorescent polymer prepared using the fluorescent oligomer poly(dimethyl adipate/methyl-bis-hexamethylene triamine/3-hydroxyflavone) and poly(trimethylene terephthalate), compared to poly(trimethylene terephthalate) without the fluorescent oligomer.

FIG. 2 shows the excitation profile and emission spectra of a fluorescent polymer prepared using the fluorescent oligomer poly(dimethyl adipate/methyl-bis-hexamethylene triamine/7-hydroxy-4-(trifluoromethyl)coumarin) and poly(trimethylene terephthalate), compared to poly(trimethylene terephthalate) without the fluorescent oligomer.

FIG. 3 shows the excitation profile and emission spectra of a fluorescent polymer prepared using the fluorescent oligomer, poly(dimethyl adipate/methyl-bis-hexamethylene triamine/4,5,7-trihydroxyflavone) and poly(trimethylene terephthalate), compared to poly(trimethylene terephthalate) without the fluorescent oligomer.

DETAILED DESCRIPTION

Figure 1:
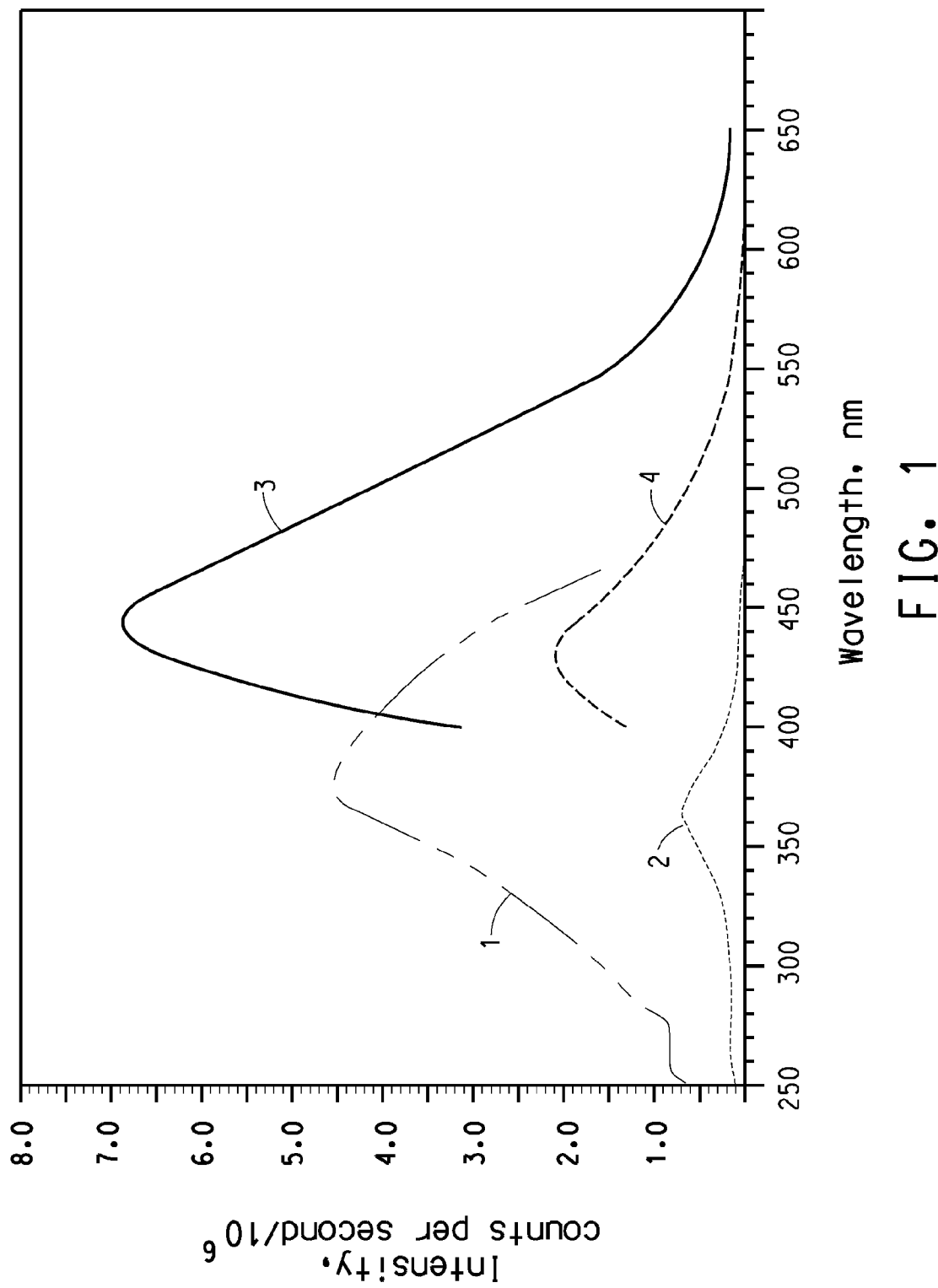
FIGS. 1-3 show excitation and emission spectra prepared using Test Method 2 (Fluorescent Spectra Analysis, below). Spun fibers were used in each case. In each Figure, Curve 1 is the excitation profile for the fluorescent poly(trimethylene terephthalate) containing the fluorescent compound; Curve 2 is the excitation profile for the control poly(trimethylene terephthalate) without the fluorescent compound; Curve 3 is the emission spectrum of the fluorescent poly(trimethylene terephthalate) containing the fluorescent compound; and Curve 4 is the emission spectrum for the control poly(trimethylene terephthalate) without the fluorescent compound.

The present invention provides fluorescent poly(alkylene terephthalate) compositions comprising poly(alkylene terephthalate)s; fibers, fabrics, films and other articles made from the fluorescent poly(alkylene terephthalate) compositions comprising poly(alkylene terephthalate)s; and processes for making such compositions. The compositions can be made from a fluorescent compound and one or more poly (alkylene terephthalate) oligomers or polymers, or from a fluorescent compound and one or more amines, acids, diols, diacids or esters.

In the absence of an indication to the contrary, the term "poly(alkylene terephthalate)" as used herein is meant to encompass homopolymers and copolymers containing at least about 70 mole % alkylene terephthalate repeat units and compositions, e.g., blends, containing at least about 70 mole % of poly(alkylene terephthalate) homopolymers or copolyesters based on the total number of moles of the diol and diacid components of the polymers. The poly(alkylene terephthalate) can contain minor amounts of other comonomers, and such comonomers are preferably selected so that they do not have significant adverse affect on properties. Such other comonomers include 5-sodium-sulfoisophthalate, for example, at a level in the range of about 0.2 to about 5 mole %. Minor amounts of trifunctional comonomers, such as, for example trimellitic acid in an amount less than about 5 mole %, can be incorporated for viscosity control.

While it is not intended that the present invention be bound by any particular theory, it is believed that the fluorescent compound can act as a chain terminator at a temperature of about 200° C. or less by reacting with free carboxylic acid end groups present in the oligomers, esters and acids used in the preparation of the fluorescent compositions. While the fluorescent oligomer may have an intrinsic viscosity (IV) that is undesirably low for satisfactory spinning, in contrast to conventional fluorescent compounds, it is stable enough to be compounded into poly(alkylene terephthalate) and the poly (alkylene terephthalate) so compounded can be spun at temperatures of about 265° C.

When an amount, concentration, or other value or parameter is recited herein as either a range, preferred range or a list of upper preferable values and lower preferable values, the recited amount, concentration, or other value or parameter is intended to include all ranges formed from any pair of any upper range limit or preferred value and any lower range limit or preferred value, regardless of whether such ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Compounding of a fluorescent oligomer with a polymer can be carried out by melt blending. The preferred temperature for melt blending, as well as for other processes such as spinning, depends upon properties of the poly(alkylene terephthalate), particularly its melting point and molecular weight. The processes disclosed herein that include melt blending of a fluorescent compound or oligomer with a polymer can be desirably carried out at temperatures from about 200 to about 290° C. More specifically, preferred melt blending temperatures are 255-290° C. for poly(ethylene terephthalate), and 240-255° C. for poly(trimethylene terephthalate) and poly(tetramethylene terephthalate). Preferred melt blending temperatures are about 275-290° C. for poly(ethylene terephthalate), and about 255-265° C. for poly(trimethylene terephthalate) and poly(tetramethylene terephthalate).

The number average molecular weight, $M_n$, of a poly(alkylene terephthalate) polymer for use in the processes disclosed herein is preferably at least about 15,000, more preferably at least about 18,000, and is preferably about 40,000 or less, more preferably about 35,000 or less. When the poly(alkylene terephthalate) is poly(ethylene terephthalate), the $M_n$ is even more preferably in a range of from about 15,000 to about 25,000, with a $M_n$ of about 25,000 still more preferred. For poly(trimethylene terephthalate), the $M_n$ is even more preferably in a range of from about 25,000 to about 35,000, with a $M_n$ range of from about 28,000 to about 29,000 still more preferred. For poly(tetramethylene terephthalate), the $M_n$ is more preferably in a range of from about 25,000 to about 35,000, with a $M_n$ of about 27,000 still more preferred.

The term "fluorescent compound" as used herein means a non-polymeric compound, including monomers, having a fluorescent moiety.

The term "fluorescent oligomer" as used herein means a polyamide oligomer, poly(trimethylene terephthalate) oligomer, poly(ethylene terephthalate) oligomer, or poly(tetramethylene terephthalate) oligomer prepared from monomers in the presence of one or more fluorescent compounds. The term "poly(alkylene) terephthalate" is also used herein to encompass poly(trimethylene terephthalate), poly(ethylene terephthalate), and poly(tetramethylene terephthalate), when used to refer to oligomers or polymers.

Polyamide and some poly(alkylene terephthalate) oligomers typically have an IV within the range of about 0.2 dL/g to about 0.8 dL/g, which is undesirable for some uses such as, for example, spinning, where an IV of at least about 0.85-1.2 dL/g is preferred. The term "poly(trimethylene terephthalate) oligomer" is used herein to refer to a poly(trimethylene terephthalate) preferably having an IV less than about 0.8 dL/g. In making the present fluorescent poly(alkylene terephthalate) compositions, poly(alkylene terephthalate) oligomers are contacted with fluorescent compounds, and subsequently heated to raise the IV to at least about 0.6 dL/g and preferably at least about 0.8 dL/g.

The term "poly(trimethylene terephthalate)", when used alone herein without further characterization, refers to a poly(trimethylene terephthalate) having an IV of at least 0.85 dL/g, generally up to about 1.2 dL/g. The term "fluorescent poly(trimethylene terephthalate)", as used herein, refers to a blend of fluorescent oligomer and poly(trimethylene terephthalate), or a poly(trimethylene terephthalate) having incorporated therein a fluorescent compound or fluorescent oligomer. More generally, the term "fluorescent poly(alkylene terephthalate)" is also used herein to refer to poly(alkylene terephthalate)s having incorporated therein a fluorescent compound or fluorescent oligomer, with the same guidelines for IV as recited hereinabove in connection with fluorescent poly(trimethylene terephthalate). The term "incorporated therein" is not intended to require that the fluorescent compound or fluorescent oligomer be necessarily chemically bound to the poly(alkylene terephthalate), although such chemical bonding is not outside the scope of the present invention.

The weight proportion of fluorescent compound incorporated (as the fluorescent compound itself or in a fluorescent oligomer) in the fluorescent poly(alkylene terephthalate) is preferably at least about 5 mg/kg of poly(alkylene terephthalate), more preferably at least about 10 mg/kg of poly(alkylene terephthalate), even more preferably at least about 50 mg/kg of poly(alkylene terephthalate), and still more preferably at least about 60 mg/kg of poly(alkylene terephthalate). Also, the weight proportion of fluorescent compound incorporated (as the fluorescent compound itself or in a fluorescent oligomer) in the fluorescent poly(alkylene terephthalate) is preferably about 20,000 mg/kg of poly(alkylene terephthalate) or less, more preferably about 10,000 mg/kg of poly(alkylene terephthalate) or less, and even more preferably about 5,000 mg/kg of poly(alkylene terephthalate) or less. Quantities of fluorescent compound greater than about 10,000 mg/kg can cause progressively increasing deterioration of the fiber grade polymer properties, which may be evidenced by a lowered IV and discoloration. Quantities less than about 10 mg/kg may not fluoresce to a useful degree for some applications.

Fluorescent compounds suitable for use in making the fluorescent poly(alkylene terephthalate) compositions include coumarins, flavones, and derivatives thereof. Examples of suitable fluorescent compounds include 1,2-disubstituted benzopyrones, 7-hydroxybenzopyrones, 10-carboxybenzopyrones, and trihydroxybenzopyrones. Preferred fluorescent compounds are 6-hydroxy-flavone [6-hydroxy-2-phenyl-4-benzopyrone]; 7-hydroxy-4-methylcoumarin [2H-1-benzopyran-2-one, 7-hydroxy-4-methyl-]; 3-hydroxyflavone [4H-1-benzopyran-4-one, 3-hydroxy-2-phenyl-]; 3,5,7-trihydroxyflavone [3,5,7-trihydroxy-2-phenyl-4-benzopyrone, 4H-1-benzopyran-4-one, 3,5,7-trihydroxy-2-phenyl-]; 4',5,7-trihydroxyflavone [5,7-dihydroxy-2-(4-hydroxyphenyl)-4-benzopyrone, 4H-1-benzopyran-4-one, 5,7-dihydroxy-2-(4-hydroxyphenyl)-]; 5,7,4'-trihydroxy-3'-methoxyflavone [5,7-dihydroxy-2-(4-hydroxy-3-methoxyphenyl)-4-benzopyrone]; coumarin 314 [1H,5H,11H-[1]benzopyrano[6,7,8-ij]quinolizine-10-carboxylic acid, 2,3,6,7-tetrahydro-11-oxo-, ethyl ester]; coumarin 343 [1H,5H,11H-[1]benzopyrano[6,7,8-ij]quinolizine-10-carboxylic acid, 2,3,6,7-tetrahydro-11-oxo-]; 4-methylesculetin [2H-1-benzopyran-2-one, 6,7-dihydroxy-4-methyl-]; 4-methyl-7-aminocoumarin [2H-1-benzopyran-2-one, 7-amino-4-methyl-]; and 7-hydroxy-4-(trifluoromethyl)coumarin [2H-1-benzopyran-2-one, 7-hydroxy-4-(trifluoromethyl)-].

In a first embodiment, which can be carried out as a two-step process, a fluorescent polyamide oligomer is prepared by contacting a fluorescent compound with one or more amine monomers and one or more diacid and/or ester monomers, e.g., acids, diols, diacids, aromatic and aliphatic esters and diesters, optionally in the presence of an inorganic acid, at an elevated temperature, preferably at least about 170° C. Also preferably, the temperature is less than about 200° C. Volatiles can be stripped by applying vacuum. The fluorescent oligomers thus produced are polyamides and contain from about 0.6% to about 20%, preferably up to about 15%, and more preferably up to about 10%, of the fluorescent compound based on the weight of the polyamide.

Examples of diols useful in the processes disclosed herein include ethylene glycol; diethylene glycol; triethylene glycol; 1,2-propanediol; 1,3-propanediol; 1,3-butanediol; 1,4-butanediol; 1,5-pentanediol; 1,6-hexanediol; 1,2-, 1,3- and 1,4 cyclohexanedimethanol; and the longer chain diols and polyols made by the reaction of diols or polyols with alkylene oxides. Examples of diacids useful in the processes disclosed herein include isophthalic acid; 1,4-cyclohexanedicarboxylic acid; 2,6-naphthalenedicarboxylic acid; 1,3-cyclohexanedicarboxylic acid; succinic acid; glutaric acid; adipic acid; sebacic acid; 1,12-dodecanedioic acid; and derivatives thereof such as the dimethyl, diethyl, or dipropyl esters of the dicarboxylic acids.

Examples of suitable inorganic acids are mineral acids such as phosphoric acid, pyrophosphoric acid, and phosphorous acid. Phosphorous acid is preferred.

Examples of suitable amine monomers include diamines, such as hexamethylene diamine and bis(hexamethylene triamine). Other amine monomers known to those skilled in the art for use in making polymers can be used.

Suitable diesters include aromatic and aliphatic esters such as, for example, dimethyl adipate, dimethyl terephthalate, dimethyl isophthalate, dimethyl naphthalate and mixtures thereof.

The fluorescent polyamide oligomer can then be melt blended with a poly(alkylene terephthalate) (as defined hereinabove), to provide a fluorescent poly(alkylene terephthalate) polymer. The amount of fluorescent polyamide oligomer used is an amount sufficient to form a fluorescent poly(alkylene terephthalate) polyester comprising about 5-20,000 mg/kg of fluorescent compound in the polyester, preferably from about 50-10,000 mg/kg, and most preferably from about 60-5,000 mg/kg. The ratio of the amount of the fluorescent oligomer to poly(alkylene terephthalate) thus depends on the concentration of the fluorescent compound in the fluorescent oligomer and the desired concentration of fluorescent compound in the fluorescent poly(alkylene terephthalate). While the desirable amount of fluorescent compounds can vary, it is generally advantageous that the amount of fluorescent oligomer be from about 0.5% to about 10% fluorescent oligomer by weight, based on the total combined weight of fluorescent oligomer and poly(alkylene terephthalate). Poly(trimethylene terephthalate) is a preferred poly(alkylene terephthalate).

In another embodiment, which can be carried out as a two-step process, a fluorescent poly(alkylene terephthalate) oligomer, preferably poly(trimethylene terephthalate), is prepared by contacting a fluorescent compound with poly(alkylene terephthalate) oligomer. This embodiment is generally preferred for use with oligomers having melting points less than about 240° C., and/or IV less than 0.8. If desired, the IV can be raised by subjecting the oligomer to heat and vacuum in a process known to those skilled in the art as "solid phase polymerization." In a preferred embodiment of such a process, the oligomer is heated at a temperature about 20° C. below its melting point, e.g., about 200° C. to about 220° C., in a vacuum oven at a vacuum of about 300 mm Hg (39 kPa) under a slow nitrogen stream. Solid-phase polymerization can raise the intrinsic viscosity to about 1.0 dL/g or higher for subsequent spinning of fibers. It is preferred that the poly(alkylene terephthalate) have an IV of about 1.2 or less for ease of processing and spinning, while poly(alkylene terephthalate)s having an IV of about 0.85 or lower may not have desirable fiber properties.

In one embodiment of a solid phase polymerization process for making a fluorescent poly(alkylene terephthalate) polymer, a poly(alkylene terephthalate) oligomer is contacted with the fluorescent compound in an inert environment at temperatures above the melting point of the oligomer, preferably no higher than about 240° C., to form a reaction mixture containing the fluorescent compound and the poly(alkylene terephthalate) oligomer. By "inert environment" is meant in an atmosphere containing or consisting of an inert gas such as nitrogen. The reaction mixture is then stripped of volatiles under vacuum to form a reaction product, which is a fluorescent poly(alkylene terephthalate) oligomer.

The fluorescent poly(alkylene terephthalate) oligomer can be melt blended with a preformed poly(alkylene terephthalate) polymer to form a fluorescent poly(alkylene terephthalate) composition that comprises a fluorescent poly(alkylene terephthalate) oligomer blended with a poly(alkylene terephthalate) polymer. For example, if a fluorescent poly(trimethylene terephthalate) oligomer is blended with poly(trimethylene terephthalate) polymer, the composition comprises a fluorescent poly(trimethylene terephthalate) oligomer blended with a poly(trimethylene terephthalate) polymer. In some embodiments, two or more different poly(alkylene terephthalate)s can be used, i.e., blended together with a fluorescent oligomer. Concentrations of the fluorescent compound in the fluorescent oligomer and fluorescent poly(trimethylene terephthalate) are as disclosed hereinabove.

In another embodiment, a preformed poly(alkylene terephthalate) polymer is directly blended with a fluorescent compound to form a fluorescent poly(alkylene terephthalate). In preferred embodiments, poly(trimethylene terephthalate) is blended with a fluorescent compound to form a fluorescent poly(trimethylene terephthalate). The concentration of the fluorescent compound is as disclosed above.

In another embodiment, the fluorescent compound can be blended with a carrier polymer. Carrier polymers include, for example, aliphatic and aromatic polyesters, polyamides, polyolefins such as polyethylene and polypropylene, polyacrylates and polymethacrylates, and polystyrene and copolymers of polystyrene. The blended fluorescent compound and carrier polymer are then melt blended or coextruded with a poly(alkylene terephthalate), such as poly(ethylene terephthalate), poly(trimethylene terephthalate), or poly(tetramethylene terephthalate), to yield a fluorescent poly(alkylene terephthalate). The carrier polymer and fluorescent compound can be blended with a poly(trimethylene terephthalate) to form a fluorescent poly(trimethylene terephthalate), containing a concentration of the fluorescent compound as disclosed above. Alternatively, a fluorescent poly(alkylene terephthalate) prepolymer, having a number average molecular weight ($M_n$), for example, from about 1,000 to about 10,000, can be prepared and added to a batch or continuous polymerization, or added to preformed polymer pellets. Solid phase polymerization can be carried out, as disclosed hereinabove.

The fluorescent poly(alkylene terephthalate)s formed according to the processes disclosed herein can be melt-processed using conventional temperatures and procedures to produce desired fibers, fabrics, films, and other useful products. Products made from the fluorescent poly(alkylene terephthalate)s, when viewed under low wavelength ultraviolet light (e.g., about 365 nm or longer), fluoresce, enhancing the whiteness of polyester articles made with delusterants (such as titanium dioxide) and enhancing the color of polyester articles containing colorants. The whiteness and color enhancement also brightens articles in daylight, due to fluorescence following absorption of the UV components of daylight. The effect is most pronounced when the article is viewed in "black light". "Black light", as used herein, means ultraviolet (UV) light having a wavelength of about 340 to 400 nm.

For spinning into fibers, the moisture content of the fluorescent poly(alkylene terephthalate) is preferably less than about 40 mg/kg polymer. Pellets of fluorescent poly(trimethylene terephthalate) can be dried in a vacuum oven, for example, at about 120° C., preferably for a minimum of about 16 hours. The drying temperature and vacuum can be adjusted as necessary to obtain the desired moisture content.

The fluorescent poly(alkylene terephthalate)s can also contain conventional additives such as antioxidants, delusterants, white pigments such as titanium dioxide and zinc oxide, colorants, dyes, stabilizers, flame retardants, fillers such as calcium carbonate, antimicrobial agents, antistatic agents, heat stabilizers, viscosity boosters, extenders, processing aids, and other functional additives known to those skilled in the art. For example, $TiO_2$ or other pigments can be added, as disclosed in U.S. Pat. Nos. 3,671,379, 5,798,433 and 5,340,909, and in EP 699 700 and 847 960, and WO 00/26301, the disclosures of which are incorporated herein by reference in their entirety. The fluorescent polymers can be processed conventionally, into, for example, chips, pellets, or flakes, of various sizes and shapes.

The fluorescent poly(alkylene terephthalate)s can be used in the forms of films; fibers such as, for example; monofilaments, bulk continuous fiber as used for carpet; staple fiber; multifilament fibers; oriented and partially oriented fibers; semi-drawn, spun drawn, textured, or fully-drawn yarns; and products made therefrom, including apparel, carpets, woven and nonwoven fabrics, nonwoven fiber, and shaped and molded articles, including engineering plastic components.

The fluorescent poly(alkylene terephthalate)s in fiber form can be used in knits, woven fabrics, and non-woven fabrics, and in blends with wool, cotton, poly(alpha-hydroxyacid), and/or other natural and synthetic fibers. The fluorescent poly(alkylene terephthalate)s can be fabricated into films and shaped articles including as engineering plastics, in powder coatings, and in molded products including molded surfaces (e.g., molded articles having a surface made from the fluorescent poly(alkylene terephthalate), surface coatings and coatings for paper and paper products. Such textile fabrics, fibers, films, and shaped articles are useful as fabrics, floor coverings, wall coverings, display, signs, designer garments, safety and emergency signs, advertising, and merchandising.

The fluorescent poly(alkylene terephthalate)s can be acid-dyeable as disclosed in U.S. Pat. No. 6,723,799 B2, the disclosures of which are incorporated herein by reference.

In some embodiments, the fluorescent polymers are substantially colorless. Colorless polymers are desired for some applications, for example, in colorless, transparent or white products. While fluorescence may improve the brightness of white and some colored products, colored fluorescent polymers can distort the color of colored products containing them.

Examples of copolymers that can be used in making the fluorescent poly(alkylene terephthalate)s include copolyesters made using 3 or more reactants, each having two ester forming groups. For example, a copoly(alkylene terephthalate) can be used in which the comonomer used to make the copolyester is selected from linear, cyclic, and branched aliphatic dicarboxylic acids having 4-12 carbon atoms, such as, for example: butanedioic acid, pentanedioic acid, hexanedioic acid, dodecanedioic acid, and 1,4-cyclo-hexanedicarboxylic acid; aromatic dicarboxylic acids other than terephthalic acid and having 8-12 carbon atoms, such as, for example isophthalic acid and 2,6-naphthalenedicarboxylic acid; linear, cyclic, and branched aliphatic diols having 2-8 carbon atoms, other than 1,3-propanediol, such as, for example: ethanediol, 1,2-propanedio, 1,4-butanediol, 3-methyl-1,5-pentanediol, 2,2-dimethyl-1,3-propanediol, 2-methyl-1,3-propanediol, and 1,4-cyclohexanediol; aliphatic and aromatic ether glycols having 4-10 carbon atoms, such as, for example: hydroquinone bis(2-hydroxyethyl) ether; and poly(ethylene ether) glycols having a molecular weight below about 460, including diethylene ether glycol. The comonomer typically is present in the copolyester at from about 0.5 to about 15 mole %, and can be present in amounts up to 30 mole %.

Blends of poly(alkylene terephthalate)s can be used in the process to make fluorescent poly(alkylene terephthalate)s, or fluorescent poly(alkylene terephthalate)s made according to the processes disclosed herein can be blended with other non-fluorescent poly(alkylene terephthalate)s. Blends containing poly(trimethylene terephthalate) can be made, preferably containing about 70 mole % or more of poly(trimethylene terephthalate). For example, poly(trimethylene terephthalate) can be admixed with up to 30 mole % of one or more polyesters made from other diols or diacids. Also useful are polymeric compositions and copolymers comprising one or more functional additives or monomers.

In some preferred embodiments, blends are made that contain at least about 70 mole % poly(alkylene terephthalate) and one or more other polymers. For example, poly(trimethylene terephthalate) can be blended with other polymers such as poly(ethylene terephthalate), nylon 6, nylon 6,6, poly(tetramethylene terephthalate). Preferably, blends contain 70 mole % or more poly(trimethylene terephthalate), more preferably at least 80, 90, 95 or 99 mole % poly(trimethylene terephthalate). However, in some embodiments, blends can be made that contain 70 mole % or more, such as at least 80, 90, 95 or 99 mole % poly(ethylene terephthalate). In some embodiments, blends contain 70 mole % or more, such as at least 80, 90, 95 or 99 mole % poly(tetramethylene terephthalate). In other embodiments, blends are made that contain 70 mole % or more, preferably at least 80, 90, 95 or 99 mole % of two or more poly(alkylene terephthalate)s, which can include poly(trimethylene terephthalate). Blends can be made of the fluorescent poly(alkylene terephthalate)s and polystyrenes, for example, as disclosed in U.S. patent application Ser. No. 2004/0001950 A1.

The fluorescent poly(alkylene terephthalate) can be blended with up to 30 mole percent of one or more other polymers. Examples are polyesters prepared from other diols, such as those disclosed above. Polymeric additives can be added to improve strength, to facilitate post extrusion processing or provide other benefits. For example, hexamethylene diamine can be added in minor amounts of about 0.5 to about 5 mole % to add strength and processability to the acid dyeable polyester compositions of the invention. Polyamides such as Nylon 6 or Nylon 6,6 can be added in minor amounts of about 0.5 to about 5 mole % to add strength and processability to the acid-dyeable polyester compositions of the invention. A nucleating agent, preferably 0.005 to 2 weight % of a mono-sodium salt of a dicarboxylic acid selected from monosodium terephthalate, mono sodium naphthalene dicarboxylate and mono sodium isophthalate, can be added as disclosed in U.S. Pat. No. 6,245,844, which is incorporated herein by reference.

For some applications, particularly for spinning, the IV of the fluorescent poly(ethylene terephthalate) is preferably at least about 0.5 dL/g, more preferably at least about 0.8 dL/g, and even more preferably at least about 0.85 dL/g. Also preferably, the IV is about 1.2 dL/g or less, more preferably about 1.1 dL/g or less. Poly(trimethylene terephthalate) homopolymers particularly useful in making the fluorescent poly(trimethylene terephthalate)s have a melting point of approximately 225-231° C. Poly(alkylene terephthalate)s having varied inherent viscosities are commercially available, and can be selected and/or blended for particular applications by one skilled in the art.

The fluorescent poly(alkylene terephthalate)s can be manufactured by batch, semi-batch, continuous and other known techniques. Poly(trimethylene terephthalate) and preferred manufacturing techniques for making poly(trimethylene terephthalate) are disclosed in U.S. Pat. Nos. 5,015,789, 5,276,201, 5,284,979, 5,334,778, 5,364,984, 5,364,987, 5,391,263, 5,434,239, 5,510454, 5,504,122, 5,532,333, 5,532,404, 5,540,868, 5,633,018, 5,633,362, 5,677,415, 5,686,276, 5,710,315, 5,714,262, 5,730,913, 5,763,104, 5,774,074, 5,786,443, 5,811,496, 5,821,092, 5,830,982, 5,840,957, 5,856,423, 5,962,745, 5,990,265, 6,235,948, 6,245,844, 6,255,442, 6,277,289, 6,281,325, 6,312,805, 6,325,945, 6,331,264, 6,335,421, 6,350,895, and 6,353,062, EP 998 440, WO 00/14041 and 98/57913, H. L. Traub, "Synthese und textilchemische Eigenschaften des Poly-Trimethyleneterephthalats", Dissertation Universitat Stuttgart (1994), S. Schauhoff, "New Developments in the Production of Poly(trimethylene terephthalate) (PTT)", Man-Made Fiber Year Book (September 1996), and U.S. patent application Ser. No. 10/057,497, all of which are incorporated herein by reference. Continuous processes such as disclosed in U.S. Pat. No. 6,353,062, and U.S. Pat. No. 6,538,076, which are incorporated herein by reference, are preferred. Similar techniques are used for poly(ethylene terephthalate) and poly(tetramethylene terephthalate).

In some embodiments, when the fluorescent polymers are made into yarns, the yarns are partially oriented. Partially oriented yarns of poly(trimethylene terephthalate) are disclosed in U.S. Pat. Nos. 6,287,688 and 6,333,106, and U.S. Patent Publication No. 2001/30378, all of which are incorporated herein by reference. The basic steps of manufacturing partially oriented yarns including spinning, interlacing and winding poly(trimethylene terephthalate) filaments are disclosed therein. Spinning can be practiced using methods conventionally used for making partially oriented polyester yarns.

Multicomponent fibers can be formed from the fluorescent polymers, for example, bicomponent fibers comprising fluorescent poly(ethylene terephthalate) and fluorescent poly(trimethylene terephthalate), fluorescent poly(ethylene terephthalate) and fluorescent poly(tetramethylene terephthalate) or two different fluorescent poly(trimethylene terephthalate)s may contain color pigment in one or both components. The components can be arranged in a sheath-core, eccentric sheath-core, or side-by-side arrangement. When it is desired that the bicomponent fiber is crimpable on drawing, heat-treating, and relaxing to form a stretchable fiber, an eccentric sheath-core or side-by-side relationship can be used; side-by-side is preferred for higher crimp levels. The preferred 2GT/poly(trimethylene terephthalate) bicomponent fibers can be manufactured as disclosed in copending U.S. patent application Ser. Nos. 09/708,314 and 09/758,309 which are incorporated herein by reference.

EXAMPLES

Test Methods

The following test methods were used in the evaluation of fluorescent polymers.

Test Method 1. Intrinsic Viscosity

The intrinsic viscosity (IV) was determined using viscosity measured with a Viscotek Forced Flow Viscometer Y900 (Viscotek Corporation, Houston, Tex.) for the poly(trimethylene terephthalate) or poly(tetramethylene terephthalate) dissolved in 50/50 weight % trifluoroacetic acid/methylene chloride at a 0.4 grams/dL concentration at 19° C. following an automated method based on ASTM D 5225-92. These measured IV values were correlated to IV values measured manually in 60/40 weight % phenol/1,1,2,2-tetrachloroethane following ASTM D 4603-96.

Test Method 2. Fluorescent Spectra Analysis

Luminescence excitation and emission spectra were obtained for the fluorescent fibers and on the fluorescent polymers prepared as written in the Examples. A Fluorolog 322 instrument (Jobin Yvon Inc/Edison/N.J.) was used, the illumination parameters were 450 W Xenon lamp, two 300 nm blazed gratings with 1200 lines/nm. Sample parameters: no polarizers, 45° quartz triangular cell solid sample holder, and excitation 90° to emission. Detection parameters: two 500 nm blazed gratings 1200 lines/nm, Hamamatsu R928 photomultiplier tube, 950V.

Example 1

A mixture of dimethyl adipate (61.8 g, 0.35 moles), methyl-bis-hexamethylene triamine (82.0 g, 0.35 moles), 7-hydroxy-4-methyl-coumarin (1.270 g, 7.2×10$^{-3}$ moles), phosporous acid (0.54 g, 6.5×10$^{-3}$ moles) and water (1.90 g, 0.11 moles) was heated slowly up to 200° C. By-product methanol was distilled from the system. Reduced pressure (~0.4-0.5 mmHg, 53-67 Pa) was applied for approximately 10-15 minutes to complete the polymerization. The fluorescent polymer was cooled under nitrogen.

A control polymer was prepared in the same way without the fluorescent compound (7-hydroxy-4-methyl-coumarin). The polymers were compared by fluorescence spectroscopy.

Example 2

A mixture of dimethyl adipate (43.4 g, 0.25 moles), hexamethylene diamine (29.0 g, 0.25 moles), 7-hydroxy-4-methyl-coumarin (0.891 g, 5.06×10$^{-3}$ moles), phosporous acid (0.378 g, 4.61×10$^{-3}$ moles) and water (1.295 g, 0.07 moles) was heated slowly to 200° C. By-product methanol was distilled from the system. Reduced pressure (~0.4-0.5 mmHg, 53-67 Pa) was applied for approximately 10-15 minutes to complete the reaction. The fluorescent polymer cooled under nitrogen.

A control polymer was prepared in the same way without the fluorescent compound (7-hydroxy-4-methyl-coumarin). The polymers were compared by fluorescence spectroscopy.

Example 3

A mixture of dimethyl adipate (18.45 g, 0.11 moles), methyl-bis-hexamethylene triamine (24.35 g, 0.11 moles), 6-hydroxyflavone (0.108 g, 4.5×10$^{-4}$ moles was heated slowly up to 190° C. By-product methanol was distilled from the system. Reduced pressure (~0.4-0.5 mmHg, 53-67 Pa) was applied for approximately 10-15 minutes to complete the reaction and to remove unreacted chemicals. The fluorescent polymer was cooled under nitrogen.

A control polymer was prepared in the same way without the fluorescent compound (6-hydroxyflavone). The polymers were compared by fluorescence spectroscopy.

Example 4

A mixture of dimethyl adipate (36.9 g, 0.21 moles), methyl-bis-hexamethylene triamine (48.7 g, 0.21 moles), 3-hydroxyflavone (0.295 g, 1.24×10$^{-3}$ moles), phosporous acid (0.424 g, 5.2×10$^{-3}$ moles) and water (5.660 g, 0.31 moles) was heated slowly up to 200° C. By-product methanol was distilled from the system. Reduced pressure (~0.4-0.5 mmHg, 53-67 Pa) was applied for approximately 10-15 minutes to complete the reaction and to remove unreacted chemicals. The fluorescent polymer was cooled under nitrogen.

Example 5

A mixture of dimethyl adipate (54.75 g, 0.31 moles), methyl-bis-hexamethylene triamine (72.62 g, 0.31 moles), 7-hydroxy-4-(trifluoromethyl)coumarin (0.735 g, 3.19×10$^{-3}$ moles), phosporous acid (0.480 g, 5.85×10$^{-3}$ moles) and water (2.157 g, 0.12 moles) was heated slowly to 200° C. By-product methanol was distilled from the system. Reduced pressure (~0.4-0.5 mmHg, 53-67 Pa) was applied for approximately 10-15 minutes to complete the reaction. The fluorescent polymer was cooled under nitrogen.

Example 6

A mixture of dimethyl adipate (12.0 g, 0.068 moles), methyl-bis-hexamethylene triamine (16.0 g, 0.069 moles), 7-hydroxy-4-methyl-coumarin (0.135 g, 7.66×10$^{-4}$ moles), phosporous acid (0.1 g, 1.22×10$^{-3}$ moles) and water (0.4 g, 0.02 moles) was heated slowly to 200° C. By-product methanol was distilled from the system. Reduced pressure (~0.4-0.5 mmHg, 53-67 Pa) was applied for approximately 10-15 minutes to complete the reaction. The fluorescent polymer was cooled under nitrogen.

Example 7

A mixture of dimethyl adipate (12.0 g, 0.068 moles), methyl-bis-hexamethylene triamine (16.0 g, 0.069 moles), 7-hydroxy-4-methyl-coumarin (0.0675 g, 3.83×10$^{-4}$ moles), phosporous acid (0.1 g, 1.22×10$^{-3}$ moles) and water (0.4 g, 0.02 moles) was heated slowly to 200° C. By-product methanol was distilled from the system. Reduced pressure (~0.4-0.5 mmHg, 53-67 Pa) was applied for approximately 10-15 minutes to complete the reaction. The fluorescent polymer was cooled under nitrogen.

Example 8

A mixture of dimethyl adipate (12.0 g, 0.068 moles), methyl-bis-hexamethylene triamine (16.0 g, 0.069 moles), 7-hydroxy-4-methyl-coumarin (0.540 g, 3.07×10$^{-3}$ moles) was heated slowly to 200° C. By-product methanol was distilled from the system. Reduced pressure (~0.4-0.5 mmHg, 53-67 Pa) was applied for approximately 10-15 minutes to complete the reaction. The fluorescent polymer was cooled under nitrogen.

Example 9

A mixture of dimethyl adipate (12.0 g, 0.068 moles), methyl-bis-hexamethylene triamine (16.0 g, 0.069 moles), 4-methylesculetin (0.192 g, 1.00×10$^{-3}$ moles) was heated slowly to 200° C. By-product methanol was distilled from the system. Reduced pressure (~0.4-0.5 mmHg, 53-67 Pa) was applied for approximately 10-15 minutes to complete the reaction. The fluorescent polymer was cooled under nitrogen.

A control polymer was prepared in the same way without the fluorescence compound (4-methylesculetin). The polymers were compared by fluorescence spectroscopy.

Example 10

A mixture of dimethyl adipate (86.8 g), hexamethylene diamine (58.1 g, 0.5 moles), 4,5,7-trihydroxyflavone (0.272 g, 1.0×10$^{-3}$ moles), phosporous acid (0.19 g, 2.3×10$^{-3}$ moles) and water (0.67 g, 0.037 moles) was heated slowly to 200° C. By-product methanol was distilled from the system. Reduced pressure (~0.4-0.5 mmHg, 53-67 Pa) was applied for approximately 10-15 minutes to complete the reaction. The fluorescent polymer was cooled under nitrogen.

Example 11

Poly(trimethylene terephthalate) oligomer (38.0 g) was slowly melted and 7-amino-4-methyl-coumarin (0.050 g, 2.85×10$^{-4}$ moles) was mixed with the oligomer. The mixture was stirred under nitrogen, at atmospheric pressure and the temperature was kept under 240° C. By-product water was collected for 120 minutes and then vacuum was applied (~1 mmHg, 133 Pa) for an additional 20 minutes. The fluorescent polymer was cooled under nitrogen.

Example 12

Poly(trimethylene terephthalate) oligomer (38.0 g) was slowly melted and coumarin 343 (0.050 g, 1.76×10$^{-4}$ moles) was mixed with the oligomer. The mixture was stirred under nitrogen, at atmospheric pressure and the temperature was kept under 240° C. By-product water was collected for 120 minutes and then vacuum was applied (~1 mmHg, 133 Pa) for and additional 20 minutes. The fluorescent polymer was cooled under nitrogen.

Example 13

Fluorescent polymer (105 g), prepared as in Example 1, was blended and reacted with poly(trimethylene terephthalate) polymer, (3031 g) in a twin-screw extruder and formed into copolymer pellets to give an effective concentration of fluorescent compound in the polymer of about 30-100 mg/kg. Before spinning the pellets were dried at 120° C. for 16 hours. After drying, the pellets had an IV of 0.99 dL/g and were spun at 265° C. through a 34-hole, 12×22 spinneret at 2500 m/min. A control sample of poly(trimethylene terephthalate) was spun under the same conditions.

Example 14

Fluorescent polymer (66.5 g), prepared as in Example 4, was blended and reacted with poly(trimethylene terephthalate) polymer, (3031 g) in a twin-screw extruder and formed into copolymer pellets. Before spinning the pellets were dried at 120° C. for 16 hours. The pellets were spun at 265° C. through a 34-hole, 12×22 spinneret at 2500 m/min. A control sample of poly(trimethylene terephthalate) was spun under the same conditions. The control and fluorescent fiber samples were checked by fluorescence spectroscopy (FIG. 1).

Example 15

Figure 2:
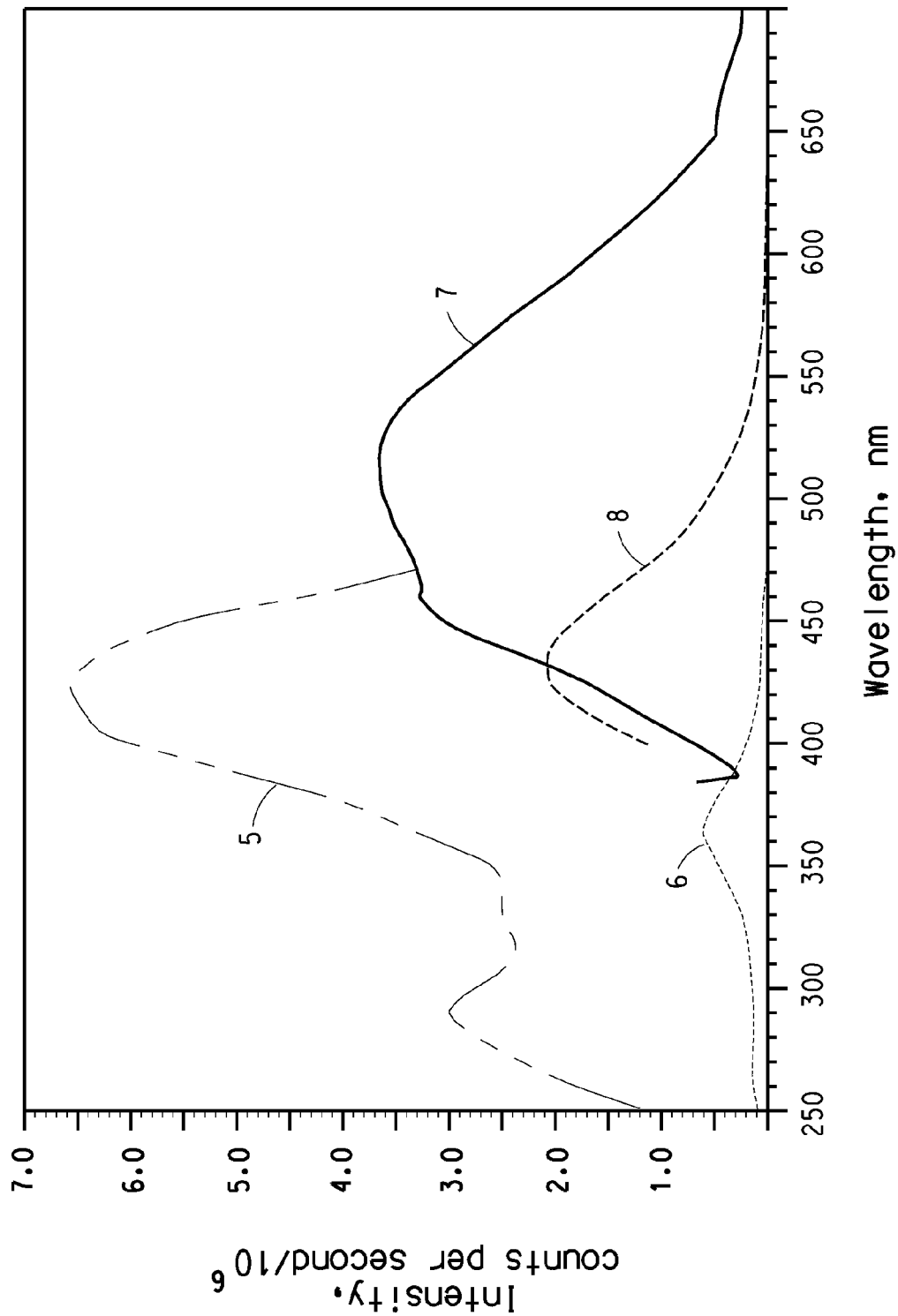

Fluorescent polymer (102.5 g), prepared as in Example 5, was blended and reacted with poly(trimethylene terephthalate) polymer, (3030 g) in a twin-screw extruder and formed into copolymer pellets to give an effective concentration of fluorescent compound in the polymer of about 30-100 mg/kg. Before spinning the pellets were dried at 120° C. for 16 hours. The pellets were spun at 265° C. through a 34-hole, 12×22 spinneret at 2500 m/min. A control sample of poly(trimethylene terephthalate) was spun under the same conditions. The control and fluorescent fiber samples were checked by fluorescence spectroscopy (FIG. 2).

Example 16

Figure 3:
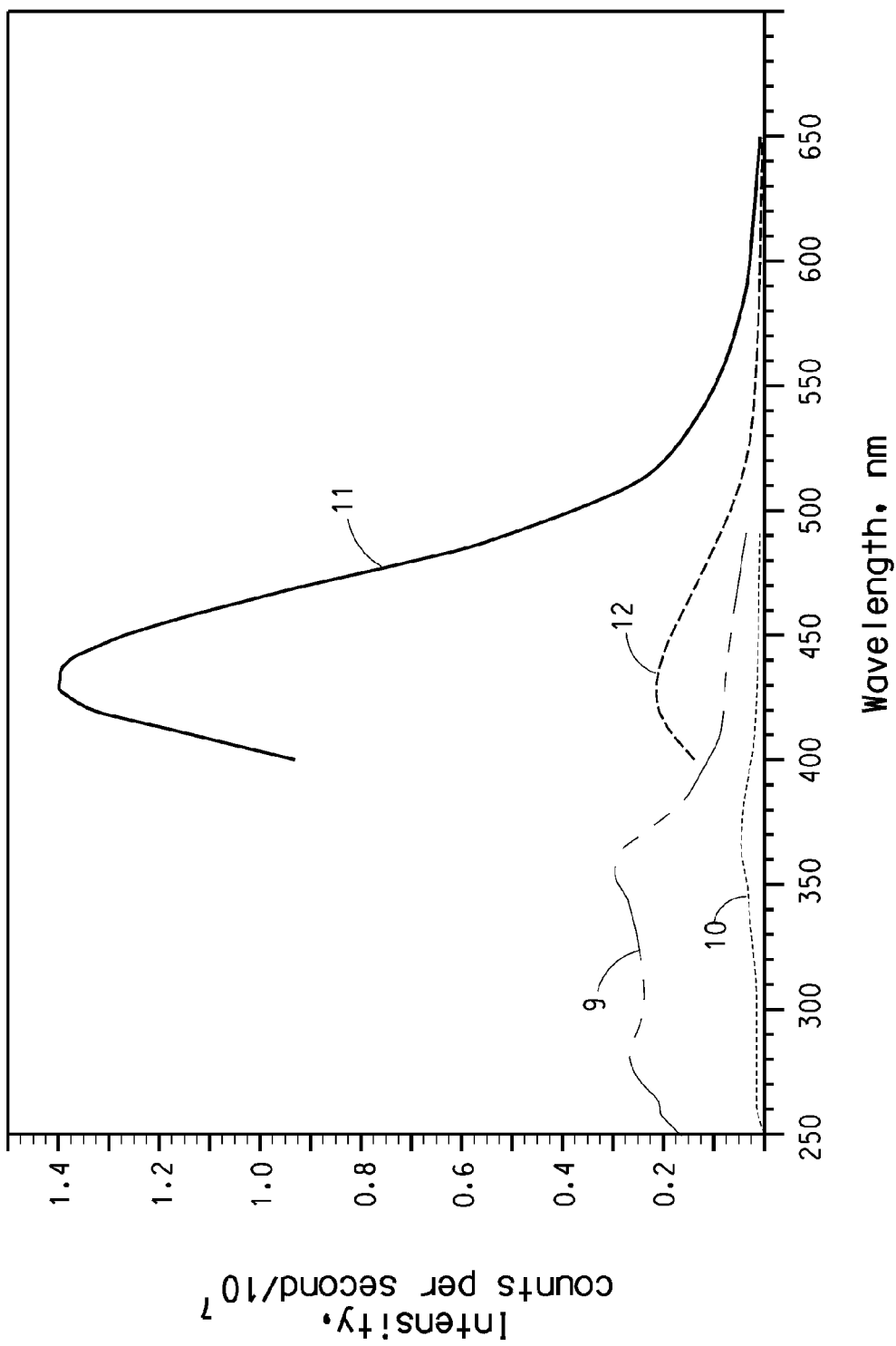

Fluorescent polymer (106.5 g), prepared as in Example 10, was blended and reacted with poly(trimethylene terephthalate) polymer, (3031 g) in a twin-screw extruder and formed into copolymer pellets to give an effective concentration of fluorescent compound in the polymer of about 30-100 mg/kg. Before spinning the pellets were dried at 120° C. for 16 hours. The pellets were spun at 265° C. through a 34-hole, 12×22 spinneret at 2500 m/min. A control sample of poly(trimethylene terephthalate) was spun under the same conditions. The control and fluorescent fiber samples were checked by fluorescence spectroscopy (FIG. 3).

What is claimed is:
1. A fluorescent poly(alkylene terephthalate) composition comprising
   one or more poly(alkylene terephthalates) that is copolymerized with a fluorescent oligomer comprising a poly(alkylene terephthalate) oligomer and a fluorescent compound copolymerized as a monomer unit within the fluorescent oligomer.

2. The composition of claim 1, wherein said poly(alkylene terephthalate) is at least one of poly(trimethylene terephthalate), poly(ethylene terephthalate or poly(tetramethylene terephthalate).

3. The composition of claim 1 wherein said fluorescent oligomer comprises a fluorescent compound selected from the group consisting of: 1,2-disubstituted benzopyrones, 7-hydroxybenzopyrones, 10-carboxybenzopyrones, trihydroxybenzopyrones, and mixtures thereof.

4. The composition of claim 3 wherein said fluorescent compound is selected from the group consisting of: 6-hydroxy-flavone [6-hydroxy-2-phenyl-4-benzopyrone]; 7-hydroxy-4-methylcoumarin [2H-1-benzopyran-2-one, 7-hydroxy-4-methyl-]; 3-hydroxyflavone [4H-1-benzopyran-4-one, 3-hydroxy-2-phenyl-]; 3,5,7-trihydroxyflavone [3,5,7-trihydroxy-2-phenyl-4-benzopyrone, 4H-1-benzopyran-4-one, 3,5,7-trihydroxy-2-phenyl-]; 4',5,7-trihydroxyflavone [5,7-dihydroxy-2-(4-hydroxyphenyl)-4-benzopyrone, 4H-1-benzopyran-4-one, 5,7-dihydroxy-2-(4-hydroxyphenyl)-]; 5,7,4'-trihydroxy-3'-methoxyflavone [5,7-dihydroxy-2-(4-hydroxy-3-methoxyphenyl)-4-benzopyrone]; coumarin 314 [1H,5H,11H-[1]benzopyrano[6,7,8-ij]quinolizine-10-carboxylic acid, 2,3,6,7-tetrahydro-[1-oxo-, ethyl ester]; coumarin 343 [1H,5H,11H-[1]benzopyrano[6,7,8-ij]quinolizine-10-carboxylic acid, 2,3,6,7-tetrahydro-11-oxo-]; 4-methylesculetin [2H-1-benzopyran-2-one, 6,7-dihydroxy-4-methyl-]; 4-methyl-7-aminocoumarin [2H-1-benzopyran-2-one, 7-amino-4-methyl-]; 7-hydroxy-4-(trifluoromethyl) coumarin [2H-1-benzopyran-2-one, 7-hydroxy-4-(trifluoromethyl)-], and mixtures thereof.

5. A fiber comprising the composition of claim 1.

6. An oriented fiber according to claim 5.

7. A fabric comprising a fiber according to claim 5.

8. A carpet fiber according to claim 5.

9. A textile fiber according to claim 5.

10. A monofilament fiber according to claim 5.

11. A nonwoven fiber article comprising a fiber according to claim 5.

12. A molded article comprising the composition of claim 1.

13. A film comprising the composition of claim 1.

14. An engineering plastic comprising the composition of claim 1.

15. A powder coating comprising the composition of claim 1.

* * * * *